(12) United States Patent
Brinkmann et al.

(10) Patent No.: US 10,479,151 B2
(45) Date of Patent: Nov. 19, 2019

(54) TRAILER COUPLING COMPRISING A SENSOR

(71) Applicant: Westfalia-Automotive GmbH, Rheda-Wiedenbruck (DE)

(72) Inventors: Rene Brinkmann, Bielefeld (DE); Bernhard Sielhorst, Rheda-Wiedenbruck (DE); Tim Stockhaus, Bielefeld (DE)

(73) Assignee: Westfalia-Automotive GmbH, Rheda-Wiedenbruck (DE)

( * ) Notice: Subject to any disclaimer, the term of this patent is extended or adjusted under 35 U.S.C. 154(b) by 140 days.

(21) Appl. No.: 15/532,252

(22) PCT Filed: Dec. 1, 2015

(86) PCT No.: PCT/EP2015/078249
§ 371 (c)(1),
(2) Date: Jun. 1, 2017

(87) PCT Pub. No.: WO2016/087464
PCT Pub. Date: Jun. 9, 2016

(65) Prior Publication Data
US 2017/0334256 A1  Nov. 23, 2017

(30) Foreign Application Priority Data

Dec. 1, 2014 (DE) .......................... 10 2014 117 645
Dec. 2, 2014 (DE) .......................... 10 2014 117 712

(51) Int. Cl.
*B60D 1/24* (2006.01)
*B60D 1/06* (2006.01)
(Continued)

(52) U.S. Cl.
CPC ............... *B60D 1/248* (2013.01); *B60D 1/06* (2013.01); *B60D 1/62* (2013.01); *G01B 21/32* (2013.01)

(58) Field of Classification Search
CPC . B60D 1/248; B60D 1/06; B60D 1/62; G01B 21/32
(Continued)

(56) References Cited

U.S. PATENT DOCUMENTS 8,966,998 B2 * 3/2015 Gentner ................. B60D 1/248
73/862.621
9,150,061 B2 * 10/2015 Riehle ..................... B60D 1/01
(Continued)

FOREIGN PATENT DOCUMENTS

DE    102014101869    8/2015
EP    0589688    3/1994
(Continued)

*Primary Examiner* — Jacob D Knutson
(74) *Attorney, Agent, or Firm* — Hoffmann & Baron, LLP (57) ABSTRACT

A trailer coupling for a motor vehicle including a coupling arm for attaching a trailer or for carrying a load carrier, and including at least one sensor for detecting a deformation, caused by a load engaged on the bearing element, of a bearing element of the trailer coupling, wherein at least one recess is provided on the bearing element for the at least one sensor, wherein the at least one sensor is provided for measuring a spacing of reference surfaces of the at least one recess. The reference surfaces move toward one another or away from one another during a deformation of the bearing element and extend in a transverse manner in relation to a support section of the bearing element which deforms during stress applied by the load and/or are free from a flow of forces through the support section of the bearing element.

20 Claims, 4 Drawing Sheets

(51) Int. Cl.
*B60D 1/62* (2006.01)
*G01B 21/32* (2006.01)

(58) Field of Classification Search
USPC .......................................................... 280/511
See application file for complete search history.

(56) References Cited

U.S. PATENT DOCUMENTS

| | | | | |
|---|---|---|---|---|
| 9,981,512 B2 * | 5/2018 | Gentner | .................. | B60D 1/06 |
| 2012/0130589 A1 * | 5/2012 | Riehle | ..................... | B60D 1/01 |
| | | | | 701/36 |
| 2014/0327229 A1 | 11/2014 | Scharf | | |
| 2017/0015163 A1 * | 1/2017 | Sielhorst | .................. | B60D 1/06 |
| 2017/0305215 A1 * | 10/2017 | Scheips | .................. | B60D 1/06 |

FOREIGN PATENT DOCUMENTS

| | | | | |
|---|---|---|---|---|
| EP | 2452839 | | 5/2012 | |
| EP | 2567837 | | 3/2013 | |
| EP | 2589503 A1 * | | 5/2013 | ............... B60D 1/06 |

\* cited by examiner

TRAILER COUPLING COMPRISING A SENSOR

This application claims priority based on an International Application filed under the Patent Cooperation Treaty, PCT/EP2015/078249, filed Dec. 1, 2015, which claims priority to DE102014117645.6, filed Dec. 1, 2014 and DE102014117712.6, filed Dec. 2, 2014.

BACKGROUND OF THE INVENTION

The invention relates to a trailer coupling for a motor vehicle comprising a coupling arm for attaching a trailer or for carrying a load carrier, and comprising at least one sensor for detecting a deformation, caused by a load engaged on the bearing element, of a bearing element of the trailer coupling, in particular of the coupling arm, or a carrier arrangement for carrying or so holding the coupling arm, wherein at least one recess is provided on the bearing element for the at least one sensor, wherein the at least one sensor is provided for measuring a spacing of reference surfaces of the at least one recess.

DE 10 2014 013 812.7 discloses arranging a sensor in an indentation on the coupling arm. The sensor is for example adhered or screwed to the surfaces of the indentation which deform as a result of the force exerted by the load engaged on the trailer coupling. A sensor with two sensor parts, the distance between which changes during the stress and therefore deformation of the bearing element in the shape of the coupling arm. The deformation of the bearing element places a mechanical load on the sensor elements.

SUMMARY OF THE INVENTION

The object of the invention is therefore to provide an improved trailer coupling with a sensor for recording a deformation of the bearing element by means of a load engaging on the coupling arm.

In order to achieve the object, in a trailer coupling of the type mentioned at the start, there is a provision for the reference surfaces to extend in a transverse manner in relation to a support section of the bearing element and moving toward one another or away from one another during a deformation of the bearing element. The sense of the invention also covers the reference surfaces being free from a flow of forces transferred from the support section during the stress applied by the load engaging on the bearing element but moving toward one another or away from one another during the deformation of the bearing element.

It is provided that the reference surfaces move toward one another or away from one another during the deformation. The reference surfaces extend in a transverse manner, in particular in a right angular or approximately right angular manner to a support section of the bearer element deformed during the stress by the load and/or are free from a flow of forces caused by the support section of the bearing element, said flow of forces being transferred from the support section during stress by the load engaged on the bearing element. In the latter case, it is also possible that the reference surfaces do not run transverse to the support section of the bearing element which deforms during the load but rather runs longitudinally and/or parallel to this in its entirety or at least in sections.

It is preferably provided that the reference surfaces run transverse to a flow of forces through the support section of the bearing element.

The sensor arranged and/or measuring in or adjacent to the at least one recess is expediently protected against environmental impacts. In particular, it can for example not be damaged by an item rubbing on the knee-joint bar or along another bearing element of the trailer coupling.

In an advantageous embodiment the at least one recess forms or comprises an expansion joint or a dilatation joint. The reference surfaces for the at least one sensor advantageously form the opposite walls of the expansion joints.

It is also possible for surfaces at an angle to the walls of a recess, for example of the expansion joint or movement joint, for example surfaces which are approximately at a right angle, to form reference surfaces.

It is advantageous for the recess to extend in a transverse manner to a longitudinal direction of the support section and/or transverse to the direction of force of the force or load running through the support section.

In this way, for example, the bearing element can be a coupling arm and the recess can run transverse to the longitudinal direction of a section of the coupling arm. In this way, the support loads and/or tensile loads and/or thrust loads active on the coupling element can be measured in an optimal manner. It is possible to measure the forces acting on the coupling arm or the bearing element in the case of a recess in a transverse direction to the vehicle which runs or is arranged in this way. The recess may run, for example, in a transverse direction to the motor vehicle.

It is also possible, however, that in order to measure transverse forces of this type, in other words forces which for example run in what is known as a Y direction, a recess with corresponding reference surfaces may run in a longitudinal direction to the bearing element or coupling arm. For example, the recess may run in a longitudinal direction relative to the motor vehicle.

It is advantageously also provided that the at least one recess runs in a transverse direction relative to the motor vehicle or in a longitudinal direction relative to the motor vehicle.

It is also possible, however, for a recess to run in a diagonal direction, in other words for example at an angle between the transverse direction of the vehicle and the longitudinal direction of the vehicle.

It is possible that the at least once sensor may be accommodated in the recess fully or completely. It is also possible, however, for the sensor to merely be allocated to the recess such that the distance of the reference surfaces of the recess can be measured by the at least one sensor. An embodiment is also conceivable in which the sensor is not accommodated fully in the gap or interior space of the recess.

The reference surfaces can run in parallel to one another. It is also possible, however, for the reference surfaces to be diagonal or at an angle relative to one another and/or to have angled sections and/or curved sections.

The reference surfaces can make a relative movement in terms of their greatest expansion toward one another or away from one another when stress is exerted on the bearing element. It is also possible, however, for the reference surfaces to be movable relative to one another in the manner of a shear movement.

Several sensors can be arranged on the respective reference surface. The sensors are expediently arranged adjacent to one another transverse to a direction of a flow of force or a direction of force which runs through the support section.

The design according to the invention can for example readily be achieved in a crossbar or another bearing element of a trailer coupling. The use of a coupling arm is particularly preferable, but a bracket or a vehicle bracket to hold the coupling arm or another fixing device or bearing device can in accordance with the invention be designed as bearing elements with corresponding sensors, in other words in accordance with the invention with recesses arranged for the sensors.

The coupling arm or the other bearing element can of course have several sensors and/or several recesses. In this way, it is possible to record the deformation of the bearing element, in particular therefore the coupling arm, in several locations.

The reference surfaces are expediently free from a flow of force which is transferred from the support section during stressing by the load engaged on the bearing element. The reference surfaces are advantageously adjacent to a flow of force which runs through the support section. The flow of force therefore runs as it were past the reference surfaces while at the same time ensuring that the reference surfaces move relative to one another, recording the at least one sensor. The reference surfaces can therefore move relative to one another without a direct transfer of force or deformation, whereby according to the invention the distance between these reference surfaces is a dimension or an indicator of the deformation of the bearing element.

The reference surfaces of the support section or bearing element are advantageously in one piece with a base body of the support section or bearing element.

It is preferable if the reference surfaces run in a transverse manner, in particular at a right angle or approximately at a right angle and extend in a flow of force direction which runs through the support section.

It is also possible, however, for a reference surface or the reference surfaces with at least one direction component to extent in parallel to or longitudinally to the direction of the flow of force. In particular, in this case it is advantageous if the reference surfaces are free from a flow of forces caused by the support section of the bearing element, said flow of forces being transferred from the support section during stress by the load engaged on the bearing element.

It is expediently provided that at least one of the reference surfaces is provided on a tongue-like or arm-like indicator element. It is preferable is an indicator element of this type is provided freely in front of a base body of the bearing element. The at least one indicator element therefore for example forms a tongue or an arm.

It is possible, for example, for an indicator element with a reference surface to be moved relative to a further indicator element having a further reference surface during the stressing of a bearing element or for the indicator elements overall to be movable relative to one another. Both indicator elements can for example be designed as tongues or arms.

It is also possible, however, that only one indicator element is present, which is mounted on a reference surface which is in a fixed position relative to the bearing element or which is movably mounted away from this reference surface.

The at least one indicator element is preferably in one piece with a base body of the support section or the bearing element.

The reference surfaces are expediently arranged on end faces of the indicator elements which face one another. It is also possible, however, for a lateral face of an indicator element which is at an angle to an end face to form a reference surface. It is possible for lateral faces of indicator elements which form reference surfaces to be moved in a relative manner toward or away from one another when stress is applied to a bearing element by an engaging load.

It is also possible that a reference surface is provided on a protrusion which is not subject to the flow of forces when the bearing element is stressed. It is possible, for example, for one of the reference surfaces to be provided on a protrusion of this type while the other reference surface is provided on an arm-like protrusion.

It is preferable if the reference surfaces are arranged on opposite or adjacent indicator elements or indicator arms free from the flow of forces.

A sensor element is advantageously at least indirectly movement-coupled or connected to the reference surface free from the flow of force through the support section.

A distance between the reference surfaces is for example a maximum of 5 cm, preferably a maximum of 4 cm, in particular less than 3 cm or 2 cm. A particularly favourable distance between the reference surfaces is in the range from 2-5 mm.

In the case of a coupling arm as a bearing element, it is preferable if the at least one recess for the at least one sensor runs in a transverse direction of the motor vehicle. The transverse direction of the motor vehicle is aligned in a transverse manner, in particular transverse at a right angle, to the longitudinal direction of the motor vehicle, namely the preferential direction of movement of the motor vehicle. This transverse direction of the vehicle is so also known as the Y direction. The reference surfaces preferably run in parallel or approximately parallel to the Y direction. This arrangement is particularly suitable for the measurement of support loads or tensile loads which engage on the coupling arm or bearing element. The directions of force of the support load and the tensile load are also known as the Z direction and the X direction.

An expedient embodiment of the invention provides for at least two sensor elements or at least two sensors being allocated to a single one of the reference surfaces. Pairs of two sensor elements in each case which are arranged opposite to the recess or laterally adjacent to the recess are preferred. It is possible that at least two pairs of sensor elements of this type may be arranged on or adjacent to the recess.

It is particularly preferable if several sensors or sensor elements are arranged adjacent to one another adjacent to or in a recess or expansion joint of the bearing element which extends in the Y direction or transverse direction of the vehicle or for several sensors or sensor elements to be allocated to the reference surface in a row acting adjacent to one another.

A row arrangement of at least two sensors or sensor elements adjacent to one another on a respective reference surface is preferably provided. However, what is known as a two-dimensional arrangement is also possible, in other words directions at least two sensors or sensor elements being arranged adjacent to one another at directions that are at an angle to one another or the reference surfaces being arranged in these directions at an angle. The sensors or sensor elements can for example be arranged in a linear manner adjacent to one another or in a multidimensional manner, for example like a matrix, on the respective reference surface or can be allocated to the reference surface in this design.

Preferably the at least one recess comprises an indentation stretching from an opening on the external surface of the bearing element away, or this is so formed by the indentation. The reference surfaces are expediently at an angle to the opening, for example orthogonal. At this point, however, reference is made to the fact that the at least one recess can also be provided, as it were, in a core area of the bearing element, for example as a type of hole. If, however, the recess is designed extending on an external surface or away from an external surface, this results in, as it were, a maximum deformation being measurable by the sensor.

The recess is preferably slit-shaped. The recess is therefore preferably provided to be relatively narrow and/or on a groove. The groove can for example be U-shaped in the cross-section. A groove which expands in the region of the base of said groove is preferable, whereby the reference surfaces are provided away from the base of the groove in a narrower section. Consequently as it were an expanded or extended groove base is available, which is described in greater detail below as an expansion cavity. A T-shaped design is particular preferable, for example, which will become clear later.

An expansion cavity is expediently arranged or provided between the support section and the reference surfaces. A transverse breadth of the expansion cavity in a direction parallel to the distance between the reference surfaces is expediently greater than the distance between the reference surfaces.

The term "expansion cavity" can be understood in the sense of an expansion or widening, but also in the sense of a compression. In other words, this could also be called a compression cavity in order to express the bidirectional mobility of the reference surfaces which is improved by the expansion cavity during a respective deformation of the bearing element.

This means that a relatively significant deviation of the reference surfaces relative to one another is possible. The expansion cavity can for example run in an angular direction, in particular at a right angle to the above mentioned indentation on which the reference surfaces are provided.

The recess and the expansion cavity can have a keyhole-like, oval, elliptical or egg-shaped design. A broad range of area of the oval cavity or recess formed in the shape of a keyhole then for example forms the expansion cavity while the narrower range represents the recess for the at least one sensor.

The recess and the expansion cavity expediently have a T-shaped design. The recess forms for example a longitudinal branch, in particular one which extends from an external surface of the bearing element in the direction of the inside of this, whereby the expansion cavity forms a transverse branch to the longitudinal branch, in particular a transverse branch which runs in an orthogonal manner or at another angle transverse to the longitudinal branch.

However, the recess and the expansion cavity can also have a keyhole-like design.

What are known as arms can stick out from the support section. It is preferable if the reference surfaces are provided on free end regions of arms which stick out from the support section. The arms are preferably L-shaped and/or have branches which are at an angle to one another.

It is preferable if the at least one sensor is not provided in front of an external surface of the bearing element.

At this point, reference is made to the fact that by adjusting the design of the expansion cavity and/or recess, for example the geometry and/or size or the like, the desired deviation conditions between the reference surfaces can readily be influenced and adjusted to the respective metrological or load-based requirements. For example a small recess and/or expansion cavity can for example consciously be provided which does not significantly influence the bearing capacity of the bearing element. Greater distances and/or a greater expansion cavity can on the one hand worsen the bearing capacity of the bearing element somewhat more significantly, but on the other hand they ensure greater deviation of the reference surfaces relative to one another.

It is advantageously provided for the trailer coupling and/or the at least one sensor to have an evaluation device to evaluate at least one signal from the at least one sensor, in particular in an integral manner. The evaluation device has for example a microprocessor for processing signals from the at least one sensor and/or a memory to store sensor signals. It is preferable if the evaluation device is designed to evaluate signals related to at least one direction of force, preferably at least two directions of force.

The at least one sensor is expediently designed to record a deformation of the bearing element during stress in the direction of a vertical axis during use of the bearing element and/or at least one horizontal axis during use of the bearing element. The at least one sensor is designed to record a deformation of the bearing element during stress applied by a support load, in particular a support load acting on the coupling ball or the coupling element. However, the at least one sensor is expediently as a supplementary measure or alternatively designed to record at least one force acting along a horizontal axis, for example a thrust force or tensile force, in particular a force in the longitudinal direction of the motor vehicle and/or in the transverse direction of the motor vehicle. Consequently, it is also possible that several directions of force can be recorded using the at least one sensor.

It is preferable for the recess to communicate with a sensor support in which a component of the at least one sensor, for example an evaluation device, is arranged or can be arranged to evaluate at least one signal from the at least one sensor. The sensor support can therefore protect the components of the sensor, in particular the evaluation device. The sensor support is for example designed as an indentation, hole or the like in the bearing element.

It is preferable if the sensor support is formed from the expansion cavity or directly forms the expansion cavity in another formulation. In this way, the sensor support as it were has a double function, namely on the one hand to protect or take in at least one component of the sensor and on the other hand to have a positive impact on the expansion properties or the deviation of the reference surfaces relative to one another, for example to enable a greater deviation of the reference surfaces than that which would be possible without the presence of the expansion cavity or the sensor support.

The sensor support expediently communicates with the at least one passage opening through which a fixing element can be pushed to connect to the components of the at least one sensor arranged in the sensor support. The fixing element is for example a rivet, a screw or the like.

The bearing element preferably has an assembly opening which is provided on a transverse side of the bearing element at an angle to the reference surfaces. For example, the above mentioned indentation or recess on which the reference surfaces are provided extend away from one side of the bearing element while the assembly opening is provided on a side which is at an angle to this side, for example a transverse side of the bearing element.

It is possible for two opposing assembly openings to be provided, in other words for the at least one sensor and/or an additional component of the sensor, for example the evaluation device, to be optionally arranged through one assembly opening or through the opposite assembly opening in the sensor support or the recess.

A recess, sensor support or expansion cavity can be a passage opening, in other words it penetrates the respective bearing element. It is also possible, however, for the recess, sensor support or expansion cavity to be a blind hole or in any case a blind support, in other words it has a base and does not push through the bearing element. The recess, sensor support or expansion cavity can for example be milled out of the respective bearing element.

It is preferable if a sensor element of the at least one sensor is firmly attached at least one reference surface. For example, a capacitive, inductive or optic sensor element can be directly fixed to the reference surface. It is possible, for example, to connect a strain gauge to reference surfaces of the recess which are opposite one another so this expands or buckles when stress is applied to the support section, thereby changing the distance between the reference surfaces.

However, the connection does not have to be provided directly with the reference surface, in other words the sensor element or the sensor do not have to be adhered, riveted or the like to the reference surface. It is also possible for the sensor or the sensor element to be set in a stationary manner in another place but for the distance to the reference surface to be constant or fixed. A bearing part which will be described in greater detail below can for example be provided for this, said bearing part being connected to the deforming bearing element away from the reference surface and holding the sensor or the sensor element. The sensor element or the sensor is held in a stationary position relative to the reference surface by the bearing part, for example in a frontal position in front of the reference surface.

It is further possible for the at least one sensor as it were to measure into the distance between the reference surfaces but not to be arranged between the reference surfaces. This can be achieved for example in an optical or acoustic manner.

Expediently a sensor element of the at least one sensor is allocated to the two reference surfaces assigned to one another or it is arranged on the respective reference surface. There is a distance between the sensor elements. The sensor elements are free moving relative to one another if the reference surfaces move relative to one another during deformation of the bearing element.

A preferred embodiment of the invention provides for a respective sensor element or a sensor not to be directly connected to the reference surface or not having to be connected to this, but rather it being arranged on a bearing part. The bearing part expediently has a holding section to hold the sensor element or sensor. The sensor element for example comprises a capacitive and/or inductive and/or optic sensor element. The holding section is for example in a frontal position in front of the reference surface. A fixing section of the bearing part extends adjacent to the holding section. This fixing section in turn is connected to the bearing element, for example the coupling arm. For example, the passage opening for the fixing element stretches to the fixing section of the bearing part for the sensor so a screw or another fixing element can be connected to the fixing section through the passage opening.

The bearing part preferably has an angular, in particular L-shaped design. The bearing part can form part of the sensor. It is for example possible that a sensor surface, for example a capacitive surface or electrode, to be arranged directly on the holding section.

In particular, the reference surface is provided on a free end face of an arm section which protrudes from the support section. The sensor element or the sensor is arranged in front of the free end face. The sensor element or the sensor is preferably borne or held by the bearing part described above.

The motor vehicle can be a motor vehicle with a combustion engine, an electric engine or both. In particular, the motor vehicle is preferably a passenger vehicle.

The at least one sensor is preferably designed as a sensor module or has a sensor module.

The sensor module is therefore a structural unit which can be arranged on the coupling arm. The outer circumference contour of the sensor module, for example a housing of the sensor module, fits in or on the inner circumference contour of the indentation on the coupling arm, for example for a positive locking support.

A further positive aspect is achieved if the sensor module has a sensor housing in which the at least one sensor is arranged. Sensor parts can also be arranged in the sensor housing, which sensor parts individually come into contact with the coupling arm when the sensory module is assembled on the coupling arm, for example a first sensor part and a second sensor part. The sensor parts are expediently movable in the sensor housing relative to one another during a deformation of the coupling arm such that they are at different distances from one another and in this way a deformation of the coupling arm can be measured by a corresponding distance measurement, for example a capacitive, optical or inductive distance measurement by the sensor module.

The coupling arm can be arranged on a bracket to be fixed to the motor vehicle or already fixed to the motor vehicle in a fixed manner, in other words in a manner that cannot be separated, for example screwed or welded to this. A plug connection between the coupling arm and the bracket is also possible. Finally, the coupling arm can also be movably mounted on the bracket, for example in a pivot bearing-style manner using a pivot bearing and/or a safety chuck-style manner using a safety chuck.

A coupling piece is expediently arranged on the free end region of the coupling arm, for example a coupling ball or another shaped piece which is suitable to attach a trailer. Of course the coupling piece can also be suitable to connect a load carrier, in other words the coupling arm according to the invention can also be provided to carry a load carrier. There is for example then a plug protrusion or a plug receiver on the free end region of the coupling arm.

BRIEF DESCRIPTION OF THE DRAWINGS

The invention is described below in greater detail by means of an embodiment of the invention, whereby:

FIG. 1 is a lateral view of a trailer coupling, of which in

DETAILED DESCRIPTION OF THE PREFERRED EMBODIMENTS

Figure 1:
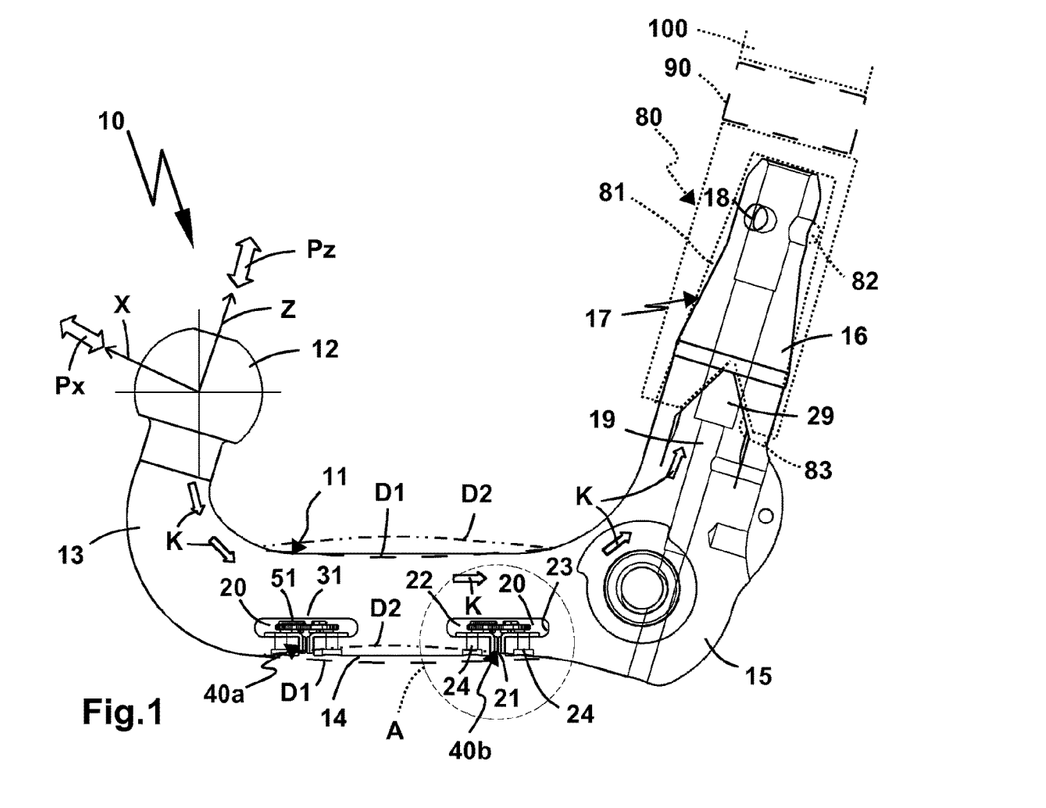

A trailer coupling 10 has a coupling arm 11 which can be fixed to a bracket 80 on the vehicle side by means of a plug-in section 16. The bracket 80 has a plug receiver 81 where the plug-in section 16 can be plugged. The coupling arm 11 can be locked to the bracket 80 by means of a locking device 17. The locking device 17 comprises a displacer (not shown), for example locking bolts, which are displaceably received in a duct 19 of the coupling arm 11. The displacer also displaces barrier bodies, for example spheres, in a radial, outward direction through openings 18 in front of the plug-in section 16, where they mesh in the at least one locking duct 82, in particular a channel, of the bracket 80.

For further support and to hold the coupling arm 11 onto the bracket 80, positive locking contours 29, for example wedge-shaped bevels, contribute to the plug-in section 16 which engages in a positive locking manner in corresponding positive locking recesses 83 of the bracket 80. The locking bodies which escape in an outward direction through the openings 18 pull the plug section 16 into the plug receiver 81 and simultaneously the positive locking contours 29 into the positive locking supports 83 such that the coupling arm 11 is firmly fixed to the bracket 80.

The bracket 80 is attached to a schematically shown crossbar 90, which in turn is fixed to the rear of the motor vehicle 100. The motor vehicle 100 is for example a passenger vehicle. The crossbar 90 runs in a transverse manner on the rear of the motor vehicle 100. The crossbar 90 and the bracket 80 may form components of the trailer coupling 10. Alternatively to this construction, it would for example be possible for the coupling arm 11 to be firmly fixed to the crossbar 90, for example screwed or the like. Furthermore, a movable position of the coupling arm 11 relative to the motor vehicle 100, in particular the crossbar 90, is also possible, which is why a pivot bearing and/or safety chuck can be found between the coupling arm 11 and the crossbar 90 or another component which is carrying the coupling arm 11 (not shown). Finally, as a peripheral note reference is made to the fact that instead of a coupling arm another bearing element, for example a bearing arm for a load carrier, can for example be provided. A bearing arm of this type or the above mentioned bracket, in particular also the pivot bearing or safety chuck can be provided in the manner explained below with recesses and allocated sensors in order to detected deformations of the respective bearing element in an optimal manner.

The coupling arm 11 has a coupling piece 12, for example a coupling ball, on its free end region. The end region of the coupling arm 11 can be found on the end of a curved section 13. An arm section 14 of the coupling arm which runs in an essentially straight manner can be found between the curved section 13 and a further curved section 15 connected to the plug section 16.

All of the above mentioned sections of the coupling arm 11, but in particular the arm section 14 which runs straight are deformed by the engaging of a load, for example a support load Pz in an axial direction of an axis Z or a tensile load/thrust load Px in the direction of an axial direction X. This is the case in particular for the arm section 14, but also for the curved sections 13, 15.

The application of force to the coupling part 12 leads for example to a flow of force K which is shown by way of an example in FIG. 1. The coupling arm 11 deforms for example along a curved line D1 or a curved line D2 regardless of whether a positive or a negative support load Pz acts on the coupling piece 12.

This deformation or curvature of the coupling arm 11 is detected by means of the sensor arrangement described below with sensors 40a and 40b.

Figure 3:
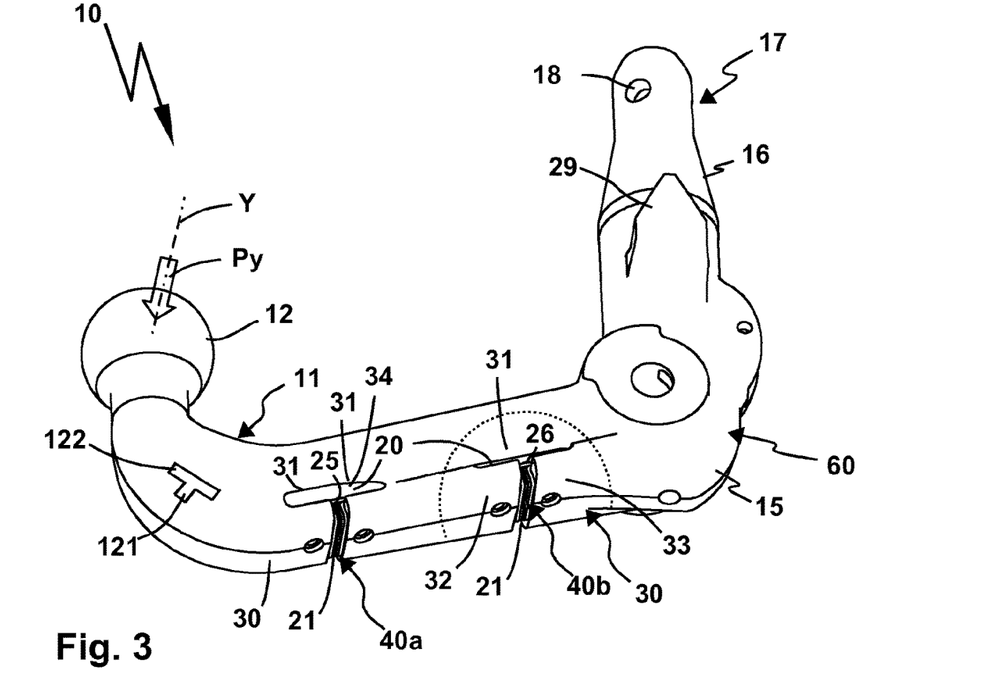
FIG. 3 is a perspective diagonal view of a coupling arm of the trailer coupling in accordance with FIG. 1, of which in FIG. 4 a section B is shown.

Sensors 40 are arranged at a longitudinal distance on the arm section 14 on the coupling arm 11 which in turn comprise sensor elements 41, 42 arranged in recesses 21. The recesses 21 are on a lower face 30 of the coupling arm 11.

Figure 2:
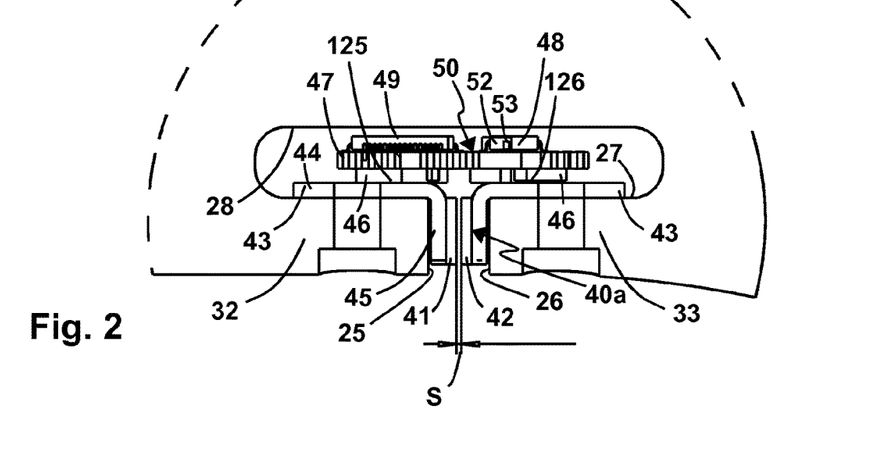
FIG. 2 a detail A is shown.
Figure 4:
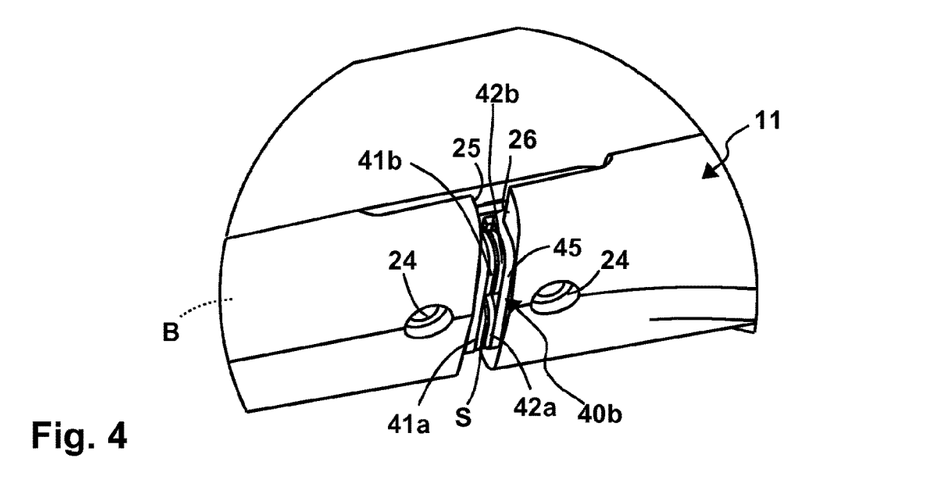

The recesses 21 comprise opposite walls which form reference surfaces 25, 26. The sensor elements 41, 42 are at least indirectly arranged on these reference surfaces 25, 26. The reference surfaces 25, 26 move toward or away from one another during a deformation of the coupling arm 11 which forms a bearing element 60 of the trailer coupling 10 such that a gap S between the sensor elements 41, 42 becomes greater or smaller. The sensor elements 41, 42 for example measure a distance between one another in a capacitive, inductive, optic or other similar manner, in other words the width of the gap S. This is at the same time an indicator for the deformation of the coupling arm 11, in other words the bearing element 60.

An expansion cavity 20 can be found adjacent to the respective recess 21. The recesses 21 and the expansion cavity 20 are at an angle to one another, for example a right angle. The recesses 21 and the respective allocated expansion cavities 20 form a T-shaped configuration.

The expansion cavities 20 and the recesses 21 are open in a lateral direction so have opposite assembly openings 34 on opposite sides of the coupling arm 11 such that the sensors 40a, 40b and the evaluation device 50 described in greater detail below can easily be assembled and disassembled. The sensors 40a, 40b and the evaluation devices 50 assigned to them form sensor modules or in any case compact construction units which can easily be assembled and disassembled.

The evaluation devices 50 are arranged in the expansion cavities 20, which therefore form sensor supports 22. The expansion cavities preferably 20 receive the evaluation devices 50 completely so they do not protrude in front of an external surface of the coupling arm 11 and are therefore optimally protected.

The sensor elements 41, 42 are arranged on bearing parts 43 which have an angular design. The bearing parts 43 have fixing sections 44 and angled bracketing sections 45 for this. The holding branches or holding sections 45 each have a sensor element 41, 42. Consequently, as it were the two holding sections 45 hang in front of the respective reference surfaces 25, 26.

The bearing parts are connected to the coupling arm 11 on the fixing sections 44, namely they are for example screwed, riveted or the like. Screws (not shown) penetrated for example passage openings 24 which communicate with the expansion cavity 20 or the sensor support 22. The screws are screwed into the fixing sections 44 so that these are connected with a base surface 27 of the sensor support 22.

However, the sensors 40a, 40b and the evaluation devices 50 do not have any contact with a top surface 28 of the sensor support 22 opposite the base surface 27, rather they are at a distance. This also applies to the longitudinal end regions 23 of the sensor supports 22, from which the bearing parts 43 and the evaluation device 50 are at a distance. Consequently, the contact between the sensors 40a, 40b and the evaluation device 50 is as it were limited to the base region 27.

The evaluation device 50 and the sensors 40a, 40b are however not in contact with a support section 31 of the bearing element 60 or coupling arm 11 which extends along the top surface 28. This support section 31 can therefore freely deform when stress is applied to the coupling arm 11, for example by means of the support load Pz, the tensile load Px or in a transverse direction to this, namely in what is known as the transverse direction of the motor vehicle, in the direction of a Y axis with a force Py.

Arms 33, 32, the outside of which arm formed by the lower face 30 of the coupling arm 11 but the insides of which are allocated to the expansion cavity 20 and carry the fixing sections 44 of the bearing parts 43 extend adjacent to the sensor support 22 and the expansion cavity 20.

The reference surfaces 25, 26 are formed by the free end faces of the arms 32, 33 or arranged on these.

At this point, reference is made to the fact that the sensor elements 41, 42 can of course be arranged directly on the reference surfaces 26, for example adhered or otherwise connected to the respective reference surfaces 25, 26.

The evaluation devices 50 comprise a carrier 47, for example an electric circuit board or printed circuit board, are arranged on the evaluation elements, for example a microprocessor 49, measuring elements 48, a bus coupler 51 or similar other elements to evaluate sensor signals from the sensor elements 41, 42.

The evaluation devices 50 can evaluate sensor elements 41, 42. In order to do this, an evaluation program 53 is saved in a memory 52, said evaluation program containing programming code which can be carried out by the microprocessor 49.

When evaluating the Py force acting in a transverse direction in particular, it is advantageous if several sensor elements, for example capacitive or inductive sensor elements are arranged in a respective slit or a recess 21 in the longitudinal direction of the recess 21. For example, in the arrangement according to FIG. 4, sensor elements 41a, 41b and on the opposite side further sensor elements 42a, 42b are arranged along the gap S. In the event of a transverse stress to the coupling arm 11, in other words to the bearing element 60, in the Y direction (Py force), the bearing element 60 or the coupling arm 11 are as it were deformed relative to the axis X, resulting for example in the sensor elements 41a and 42a being at a different distance from one another than the sensor elements 41b and 42b. The evaluation device 50 then evaluates this accordingly.

At this point, reference is made to the fact that it is advantageous for a recess such as the recess 21 extends from the outside surface, for example the lower face 30. However, this does not have to be the case. For example, recesses are also possible which are designed according to the invention in the core region of the coupling arm 11, in other words a bearing element 60. This is indicated by way of an example in FIG. 3 in the design of a recess 121. The recess 121 communicates with an expansion cavity 122 such that a similar configuration is achieved as in the case of the recess 21 and the expansion cavity 22.

Reference is also made to the fact that of course the bracket 80 or the crossbar 90 can be equipped with sensors according to the invention if the corresponding recesses are provided.

An embodiment additionally shown in FIG. 2 further shows that reference surfaces 125, 126 within the expansion cavity 20 are also free from the flow of forces as a result of the support section 31. The sensor elements 41, 42 and the bearing parts 43 which carry the sensor elements 41, 42 are connected to these reference surfaces 125, 126, for example adhered and/or through the passage opening 24 by means of screwing. The sensor elements 41, 42 therefore move synchronously to a movement of the reference surfaces 125, 126 such that they can detect a relative movement of the reference surfaces 125, 126. This example also shows that the reference surfaces 125, 126 do not have to be directly opposite one another but for example can also be arranged adjacent to one another.

Figure 5:
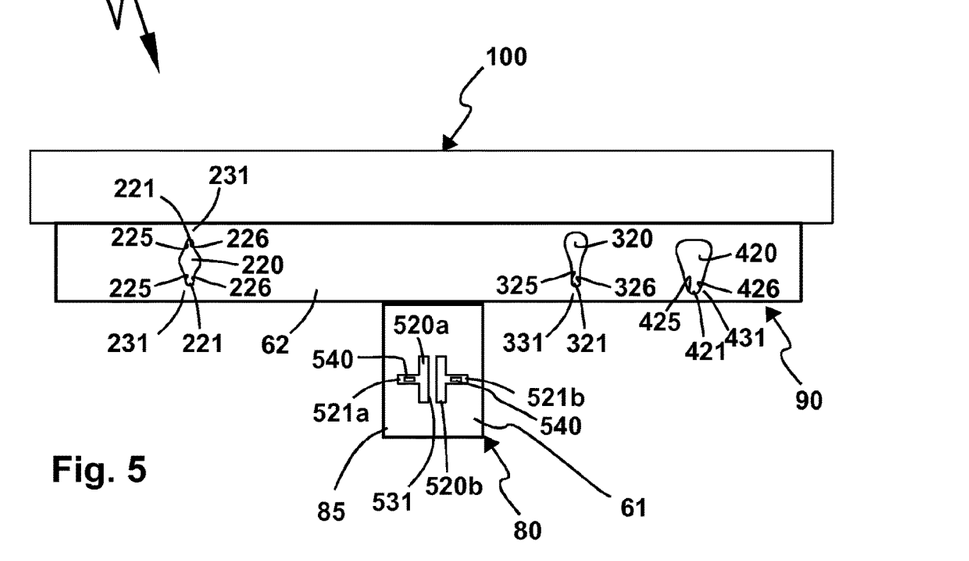
FIG. 5 is a schematic frontal view of a bearing arrangement and a holder for a coupling arm of the trailer coupling according to the figures above.

An embodiment which is to be understood in a schematic manner is shown in FIG. 5. For example, recesses 221 are provided on the crossbar 90 which forms a bearing element 62, between which recesses an expansion cavity 220 can be found. A support section 231 of the crossbar 90 runs pas the respective recess 221. The recesses 221 each bite down on opposite reference surfaces 225, 226 which are allocated to sensors or sensor elements (not shown), for example the sensor elements 41, 42.

A keyhole-like contour is also provided on the crossbar 90 by way of an example, the lower region of which forms a recess 321 which has reference surfaces 325, 326 which are opposite one another. Sensor elements in the style of sensor elements 41, 42 can also be provided here. The broader or wider region of the keyhole forms an expansion cavity 320. In the event of a deformation of a support section 331 which extends adjacent to the recess 321, the recess 321 becomes wider or narrower, and this is detected accordingly by the relevant sensors, for example sensors 40a, 40b.

An essentially triangular recess is shown further right on the crossbar 90 by way of an example. The triangular recess has a narrower lower region which represents the measurement cavity as a recess 421 with reference surfaces 425, 426. The upper region of the recess is wider or broader and forms an expansion cavity 420. If a support section 431 deforms adjacent to the recess 421, the transverse width of the recess 421 changes, and therefore the distance between the reference surfaces 425, 426 also changes. A capacitive or inductive sensor element or one otherwise suitable to measure a distance can for example allocated to the reference surfaces 425, 426, for example in the manner of the sensor 40a, 40b.

Sensors to measure the expansion or compression, in other words the deformation of the bearing element 61 can be provided in a manner according to the invention in the bracket 80 or on the bracket 80 which forms bearing element 61. For example, the bracket 80 has a support housing 85 with the plug receiver 81. On the support housing 85 recesses 521a, 521b are arranged on opposite sides of a support section 531 in a mirror image, in which recesses reference surfaces are provided for the sensor 40a, 40b or the sensor elements 41, 42 for example. Expansion cavities 520a and 520b are provided immediately adjacent to the support section 531. If the bracket 80 deforms when stressed so the support section 531 curves, the slit-like recesses 521a, 521b become narrower or wider. Piezo elements can for example be provided as sensors 540 in the recesses 521a, 521b. If a recess 521 narrows, the piezo element is subject to negative pressure and generates a voltage which can be measured by the evaluation device 50 or another evaluation device.

Reference is peripherally also made to the fact that in all of the above mentioned embodiments in the figures but also in another trailer coupling according to the invention, the respective sensor or the evaluation device can be wires or wireless or both can communicate with for example a wiring system of the motor vehicle. The sensor preferably has these evaluation devices, for example a bus coupler, a line connection, a radio interface or the like.

Alternatively, it would also be conceivable for the arms 32, 33 for example to make a kind of shear movement or pivoting movement when the support section 31 is subjected to stress. A variant in which for example the reference surfaces pivot away from or toward one another is not shown in the figure.

The recess which according to the invention is essentially or entirely free from the flow of force can also for example comprise a type of tongue or tongue indicator. This is shown in the embodiment according to FIG. 6.

Figure 6:
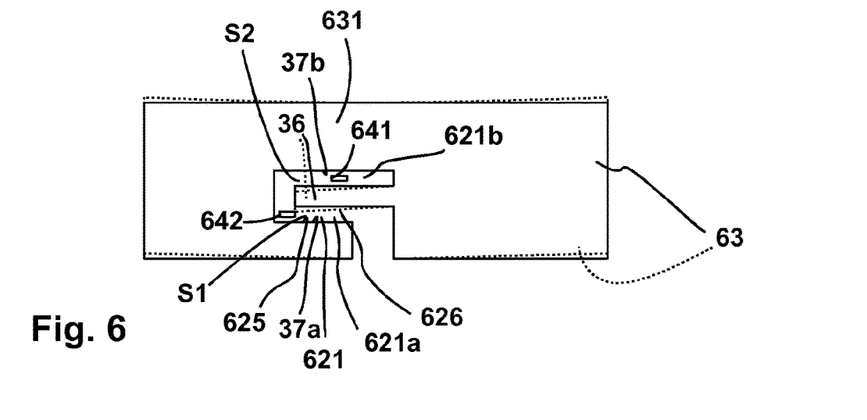
FIG. 6 is a schematic embodiment in which the recess which indicates an expansion of the bearing element, which is recorded using the sensor, is provided adjacent to a tongue-like element of the bearing element.

A labyrinth-like recess 621 is provided on a bearing element 63 (shown schematically), for example a coupling rod or a coupling arm, a crossbar, a vehicle-side bracket to hold a coupling arm or the like. A tongue-like indicator element 36 which protrudes into the recess 621 is provided in the recess 621 with sections 621a and 621b. In a deformation of the bearing element 63 (shown with a dashed line), the indicator element 36 moves backwards and forwards in the recess 621. Sensors 641 and 642, which are allocated to the sections 621b and 621a, can for example be measure different distances S1 and S2 between the indicator element 36 and the adjacent walls 37a, 37b of the recess 621. Lateral faces of the indicator element 36 and the allocated wall 37a and 37b form for example the reference surfaces 625, 626, the relative distance of which can be detected by the sensors 641, 642. The recess 621 runs adjacent to a support section 631 of the bearing element 63. It is possible to determine that the sensors 641, 642 do not have to be arranged directly in the distances S1 or S2, as is the case for example with the sensor element or the sensor 642.

Figure 7:
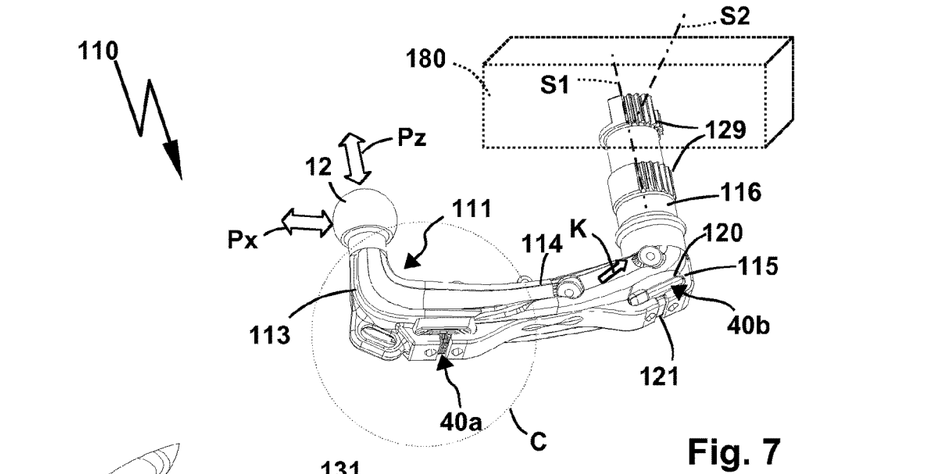
FIG. 7 is a perspective diagonal view of a further embodiment in which a coupling arm is rotatably mounted relative to an axis on the vehicle side.
Figure 8:
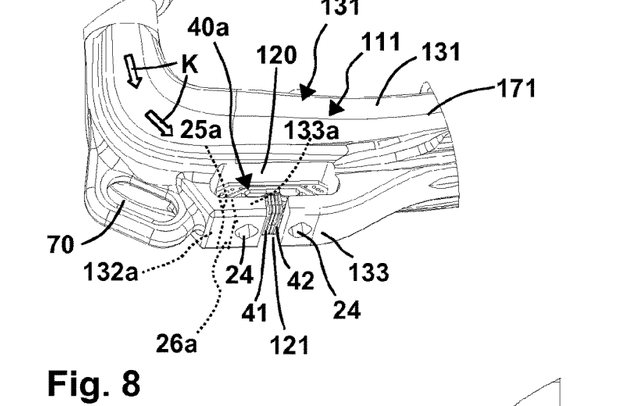
FIG. 8 is a detail C from FIG. 7.
Figure 9:
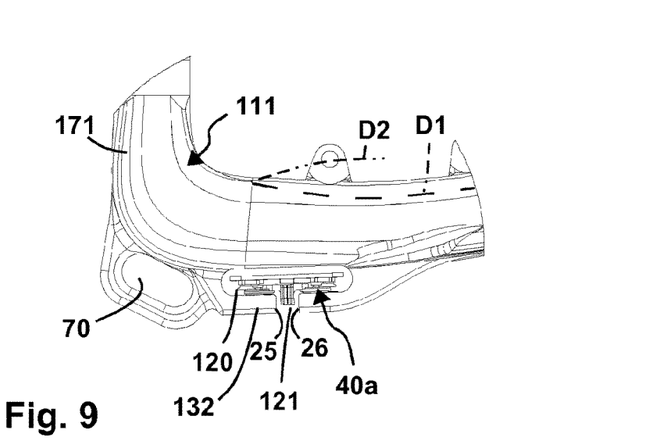
FIG. 9 is a lateral view of the detail C according to FIGS. 7 and 8.

In an embodiment shown in FIGS. 7 to 9, a coupling arm 111 is pivotably mounted relative to a vehicle-side bracket 180, for example about a pivot axis S1 and/or a pivot axis S2. Alternatively or in addition, a safety chuck position of the coupling arm 111 would also be readily possible.

The coupling arm 111 engages with a storage section 116 in the vehicle-side bracket 180 where corresponding storage elements are provided to store the coupling arm 111. Interlocking or tooth contours 129 are provided on the storage section 111 by means of which the coupling arm 111 can be driven and/or locked relative to the vehicle-side bracket 180.

The coupling arm 111 has a coupling piece 12 on its free end region which can be found on the end of a curved section 113. An essentially straight section 114 of the coupling arm 111 can be found between the curved section 113 and a further curved section 115 connected to the storage section 116.

The bracket 180 can be fixed or become fixed to the crossbar 90 in the manner explained above.

A deformation measurement is also taken on the coupling arm 111 using a sensor arrangement, the sensors 40a, 40b of which have already been described. A transmission of force to the coupling piece 12 leads for example to a flow of force K which causes a deformation of the coupling arm. This deformation occurs, for example, if a support load Pz acts in a direction of force or axial direction Z on the coupling arm. A tensile load or thrust load Px is also possible, and also leads to a deformation of the coupling arm 111. The coupling arm 111 can deform along the curved lines D2 or D1 described above (shown schematically in FIG. 9) in a similar manner to the coupling arm 111.

The sensors 40a, 40b comprise the sensor elements 41, 42 which move toward or a way from one another during a deformation of the coupling arm 111.

In contrast to the coupling arm 11, however, recesses 121 of the coupling arm 111 are relatively far out, in other words they are less deeply anchored in the base material of the coupling arm 111. Nevertheless, a deformation measurement can still be carried out successfully, as shown below. The recesses 121 are adjacent to an expansion cavity 120.

In a similar manner as for the recesses 21, however, a further expansion cavity 120 is provided for the recesses 121, which cavity forms a T-shaped configuration when combined with the recesses 121.

The evaluation devices 50 can be received in the expansion cavities 120, with for example passage openings 24 for screws being provided in the manner already explained.

The recesses 121 have reference surfaces 25, 26, as already explained. In the event of a corresponding stress on the coupling arm 111, the reference surfaces 25, 26 move toward or away from one another, and this can be detected by the sensors 40a, 40b.

Optimal protection of the sensors 40a, 40b is ensured even if the recesses 121 and the expansion cavities 120 are arranged on a radially further outward region of the coupling arm 111 compared to the recesses 21 on the coupling arm 11.

Arms 132, 133 which limit the expansion cavities 120 are comparatively wide, so a respective sensor 40a, 40b is completely taken in to the expansion cavity 120, in other words it does not protrude in front of the outer circumference of the coupling arm 111.

A tear-off loop 70 is also provided on the curved section 113 in which a tear-off rope can be hung. The tear-off loop 70 is integrally connected to the base body 171 of the coupling arm 111 or is in one piece with this.

The tear-off loop 70 is advantageously in one piece with the arm 132 and/or firmly connected to this so that this is also supported by the tear-off loop 70.

The arms 133, 132 are in front of a base body 171 of the coupling arm 111 and therefore in front of a base body of the support section 131 of the coupling arm 111 in a lateral direction. It is understood that one of the arms 131 or 132 could also be shorter.

In FIG. 8, the arm 132 is shortened to a protrusion 132a which is opposite the correspondingly longer arm 133a. The reference surfaces 25a and 26a are for example provided on the end faces of the protrusion 132a and the arm 133a which are opposite one another.

The invention claimed is:

1. A trailer coupling for a motor vehicle comprising a coupling arm for attaching a trailer or for carrying a load carrier, and comprising at least one sensor for detecting a deformation, caused by a load engaged on a bearing element of the trailer coupling, whereby at least one recess for the at least one sensor is provided on the bearing element, whereby the at least one sensor is provided for measuring a distance of reference surfaces of the at least one recess, wherein the reference surfaces move toward or away from one another during the deformation of the bearing element and extend in a transverse manner to a support section of the bearing element, which deforms during the application of stress by the load or is free from the flow of forces as a result of the support section of the bearing element, which is transferred from the support section by the load engaged on the bearing element.

2. The trailer coupling according to claim 1, wherein the reference surfaces extend in a longitudinal or transverse manner relative to a direction of a flow of forces through the support section.

3. The trailer coupling according to claim 1, wherein the at least one recess on at least one protrusion protruding in front of a base body of the bearing element or indicator element is provided.

4. The trailer coupling according to claim 1, wherein the at least one recess is slit-shaped, and has a transverse width of less than 5 mm, and extends over the entire transverse width of the bearing element.

5. The trailer coupling according to claim 1, wherein an expansion cavity is arranged between the support section and the reference surfaces, a transverse width of said expansion cavity is greater in one direction parallel to the distance between the reference surfaces than the distance between the reference surfaces.

6. The trailer coupling according to claim 5, wherein the at least one recess and the expansion cavity have an overall T-shaped or oval or egg-shaped or keyhole-shaped design.

7. The trailer coupling according to claim 5, wherein the at least one recess communicates with a sensor support in which an evaluation device to evaluate at least one signal of the at least one sensor is arranged or can be arranged.

8. The trailer coupling according to claim 7, wherein the sensor support is formed from the expansion cavity or forms the expansion cavity.

9. The trailer coupling according to claim 7, wherein the sensor support communicates with at least one passage opening by means of which a screw can be pierced in order to connect the passage opening with the components of the at least on sensor arranged in the sensor support.

10. The trailer coupling according to claim 1, wherein the at least one recess comprises at least two recesses arranged on the bearing element one after the other relative to a direction of a flow of forces exerted by the support section or wherein the at least one recess is arranged on a curved section or a straight section of the bearing element.

11. The trailer coupling according to claim 1, wherein the coupling arm has at least one mounting opening which is provided on a transverse side of the bearing element, which is at an angle to the reference surfaces.

12. The trailer coupling according to claim 1, wherein a capacitive or inductive or optic sensor element of the at least one sensor is firmly attached to at least one reference surface or wherein two reference surfaces are each allocated to one sensor element whereby the sensor elements are at a distance from one another and can be moved relative to one another.

13. The trailer coupling according to claim 1, wherein at least one sensor element of the at least one sensor is arranged on a bracketing section of a bearing part, which has a fixing section that is at an angle relative to the bracketing section that extends adjacent to the bracketing section, the bracketing section being connected to a fixing area of the bearing element adjacent to the reference surfaces.

14. The trailer coupling according to claim 13, wherein the bearing part has an L-shaped design or the bracketing section and the fixing section are formed from sides of the bearing part which are at an angle relative to one another.

15. The trailer coupling according to claim 1, wherein at least two sensor elements of the at least one sensor are arranged adjacent to one another on at least one reference surface of the reference surfaces of the at least one recess in a first row direction or at least two row directions at an angle to one another.

16. The trailer coupling according to claim 1, wherein the at least one sensor has a capacitive sensor element or an inductive sensor element or an expansion measuring strip or a distance sensor or an optic sensor element or a piezo element or a sensor housing in which at least one expansion measurement strip or a capacitive measurement surface are arranged in a manner protected against environmental influences.

17. The trailer coupling according to claim 1, wherein the recess forms or comprises an expansion joint.

18. The trailer coupling according to claim 1, wherein at least one of the reference surfaces is provided on a tongue-like or arm-like indicator element or a protrusion.

19. The trailer coupling according to claim 1, wherein the at least one recess comprises a hollow which extends from an opening on an external surface of the bearing element, whereby the reference surfaces are orthogonal, to the opening.

20. The trailer coupling according to claim 1, wherein the at least one recess is arranged on each opposite side of the support section or the recess has a broader zone arranged adjacent to the reference surfaces or a broader groove base arranged adjacent to the reference surfaces.

* * * * *